(12) United States Patent
Allard et al.

(10) Patent No.: US 12,188,710 B2
(45) Date of Patent: Jan. 7, 2025

(54) METHOD FOR RAPID ENCAPSULATION OF A CORNER GAP DEFINED WITHIN A CORNER OF A DOOR PANEL FOR AN APPLIANCE

(71) Applicant: WHIRLPOOL CORPORATION, Benton Harbor, MI (US)

(72) Inventors: Paul B. Allard, Coloma, MI (US); Gustavo Frattini, St. Joseph, MI (US); Hua Liu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/306,683

(22) Filed: Apr. 25, 2023

(65) Prior Publication Data

US 2023/0258384 A1 Aug. 17, 2023

Related U.S. Application Data

(63) Continuation of application No. 17/833,945, filed on Jun. 7, 2022, now Pat. No. 11,692,760, which is a
(Continued)

(51) Int. Cl.
*F25D 23/02* (2006.01)
*B32B 7/12* (2006.01)
(Continued)

(52) U.S. Cl.
CPC ............... *F25D 23/02* (2013.01); *B32B 7/12* (2013.01); *B32B 15/082* (2013.01); *B32B 37/12* (2013.01); *F16L 59/065* (2013.01)

(58) Field of Classification Search
CPC .. B32B 3/02; B32B 3/08; B32B 37/12; B32B 7/12; B32B 2509/10; F25D 23/02; A47L 15/4251
See application file for complete search history.

(56) References Cited

U.S. PATENT DOCUMENTS 1,538,470 A * 5/1925 Copeman ................ F25D 23/02
52/794.1
3,014,611 A * 12/1961 Marshall ............... F25D 23/064
280/832
(Continued)

FOREIGN PATENT DOCUMENTS

| EP | 1624263 | 2/2006 |
| WO | 2011058678 | 5/2011 |
| WO | 2014103773 | 7/2014 |

*Primary Examiner* — Alicia J Weydemeyer
(74) *Attorney, Agent, or Firm* — Price Heneveld LLP (57) ABSTRACT

A method of forming an insulated door panel includes folding side flanges of a metallic sheet to define side edges of a structural outer panel that extend from a front panel. A gap is defined between each set of adjacent side edges. Interior blocks are secured to an interior of the structural outer panel proximate each gap to define adhesive cavities. Exterior blocks are positioned at an exterior surface of the structural outer panel at each gap to further define the adhesive cavities. An adhesive is disposed within each adhesive cavity and is contained therein by the interior and exterior blocks. The adhesive is cured to a solid sealing member that adheres the interior blocks to the interior surface of the structural outer panel to form a sealed structural panel. The exterior blocks are removed and each solid sealing member defines a hermetic seal at each gap.

20 Claims, 9 Drawing Sheets

Related U.S. Application Data continuation of application No. 17/307,084, filed on May 4, 2021, now Pat. No. 11,402,148, which is a continuation of application No. 16/308,965, filed as application No. PCT/US2017/019930 on Feb. 28, 2017, now Pat. No. 11,029,077.

(51) Int. Cl.
  B32B 15/082 (2006.01)
  B32B 37/12 (2006.01)
  F16L 59/065 (2006.01)

(56) References Cited

U.S. PATENT DOCUMENTS

| | | |
|---|---|---|
| 3,915,328 A | 10/1975 | Hawes et al. |
| 4,196,952 A | 4/1980 | Crowe |
| 4,228,912 A | 10/1980 | Harris et al. |
| 4,273,737 A | 6/1981 | Grachten |
| 5,121,593 A | 6/1992 | Forslund |
| 6,109,712 A * | 8/2000 | Haworth ............ A47L 15/4209 312/406 |
| 11,029,077 B2 | 6/2021 | Allard et al. |
| 11,402,148 B2 | 8/2022 | Allard et al. |
| 2010/0127608 A1 | 5/2010 | Kitamura et al. |
| 2010/0236763 A1 | 9/2010 | Torok |
| 2015/0000839 A1 | 1/2015 | Czaplicki |
| 2015/0027628 A1 | 1/2015 | Cravens et al. |
| 2015/0377544 A1 | 12/2015 | Nelson |
| 2022/0299252 A1 | 9/2022 | Allard et al. |

* cited by examiner

METHOD FOR RAPID ENCAPSULATION OF A CORNER GAP DEFINED WITHIN A CORNER OF A DOOR PANEL FOR AN APPLIANCE

CROSS-REFERENCE TO RELATED APPLICATIONS

The present application is a continuation of U.S. patent application Ser. No. 17/833,945 filed Jun. 7, 2022, now U.S. Pat. No. 11,692,760, which is a continuation of U.S. patent application Ser. No. 17/307,084, filed May 4, 2021, now U.S. Pat. No. 11,402,148, which is a continuation of U.S. patent application Ser. No. 16/308,965, filed Dec. 11, 2018, now U.S. Pat. No. 11,029,077, which is a national stage entry of PCT/US2017/019930 filed Feb. 28, 2017, all of which are entitled METHOD FOR RAPID ENCAPSULATION OF A CORNER GAP DEFINED WITHIN A CORNER OF A DOOR PANEL FOR AN APPLIANCE, the entire disclosures of which are hereby incorporated herein by reference.

FIELD OF THE DEVICE

The device is in the field of cabinet structures for appliances, and more specifically, a rapid encapsulation system used for sealing a gap at corners of a door panel for an appliance.

SUMMARY

In at least one aspect, a method of forming an insulated door panel for an appliance includes steps of folding side flanges of a metallic sheet to define side edges of a structural outer panel, wherein the side edges extend from a front panel and wherein a gap is defined between each set of adjacent side edges. Interior blocks are secured to an interior surface of the structural outer panel and proximate each respective gap to define an adhesive cavity at each respective gap. Exterior blocks are positioned at an exterior surface of the structural outer panel and at each respective gap to further define the adhesive cavity at each respective gap. An adhesive is disposed within each adhesive cavity, wherein the adhesive substantially fills each gap and is contained in the adhesive cavities by the interior and exterior blocks. The adhesive is cured to form a solid sealing member within each adhesive cavity that adheres the respective interior block to the interior surface of the structural outer panel to form a sealed structural panel. The exterior blocks are removed from the exterior surface of the structural outer panel, wherein each solid sealing member defines a hermetic seal at each respective gap. A back panel is disposed onto the side edges of the structural outer panel, wherein the back panel, structural outer panel, and the solid sealing member define an insulating cavity therein.

In at least another aspect, a method for forming a vacuum insulated structure includes steps of folding a metallic sheet to define a front panel and side edges of a structural outer panel, wherein a gap is defined between each set of adjacent side edges. Interior blocks are disposed proximate each respective gap to define an adhesive cavity at each respective gap. Exterior blocks are disposed proximate each respective gap, wherein each exterior block is temporarily engaged with a respective set of adjacent side edges and further defines the adhesive cavity at the gap. An adhesive is disposed within each adhesive cavity, wherein the adhesive substantially fills each gap. The adhesive is cured to define a cured adhesive that adheres to the respective interior block and an interior surface of the structural outer panel. The exterior blocks are removed from an exterior surface of the structural outer panel, wherein the cured adhesive seals each gap defined between each set of adjacent side edges.

In at least another aspect, a method for forming a vacuum insulated structure for an appliance door includes folding a metallic sheet to form a structural outer panel that includes a plurality of side edges and a gap between each set of adjacent side edges. Interior blocks are disposed proximate an interior surface of the structural outer panel to define respective adhesive cavities. A temporary exterior dam is disposed at each gap, wherein each gap is positioned within one of the adhesive cavities. An adhesive is disposed within each adhesive cavity. The adhesive is cured to define a cured adhesive that occupies each gap within each respective adhesive cavity. Each temporary exterior dam is removed from an exterior surface of the structural outer panel, wherein the cured adhesive hermetically seals each gap.

These and other features, advantages, and objects of the present device will be further understood and appreciated by those skilled in the art upon studying the following specification, claims, and appended drawings.

DETAILED DESCRIPTION OF EMBODIMENTS

Figure 1:
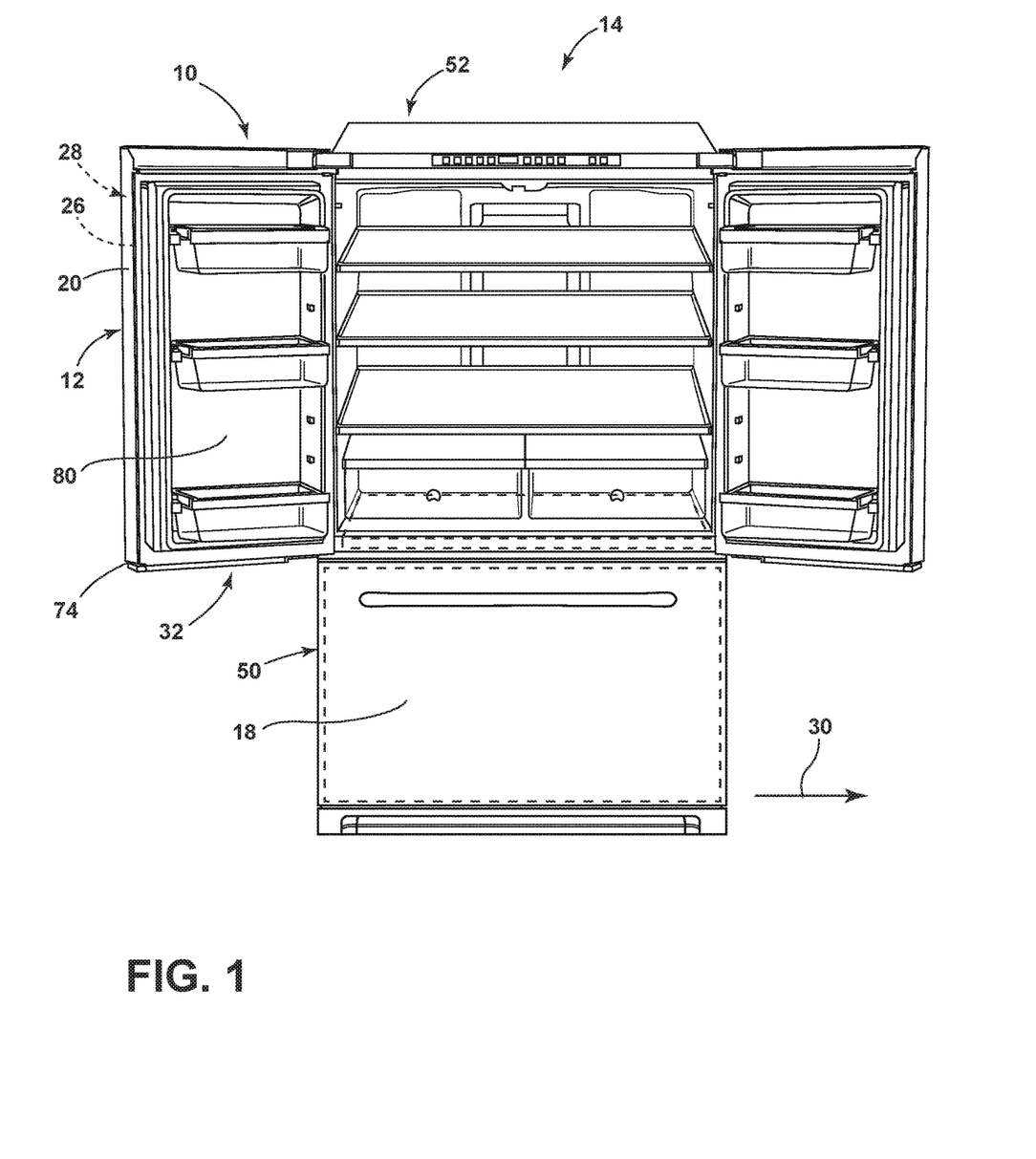
FIG. 1 is a front elevational view of an appliance incorporating an aspect of the rapid encapsulation system for sealing the corners of the door panels.
Figure 2:
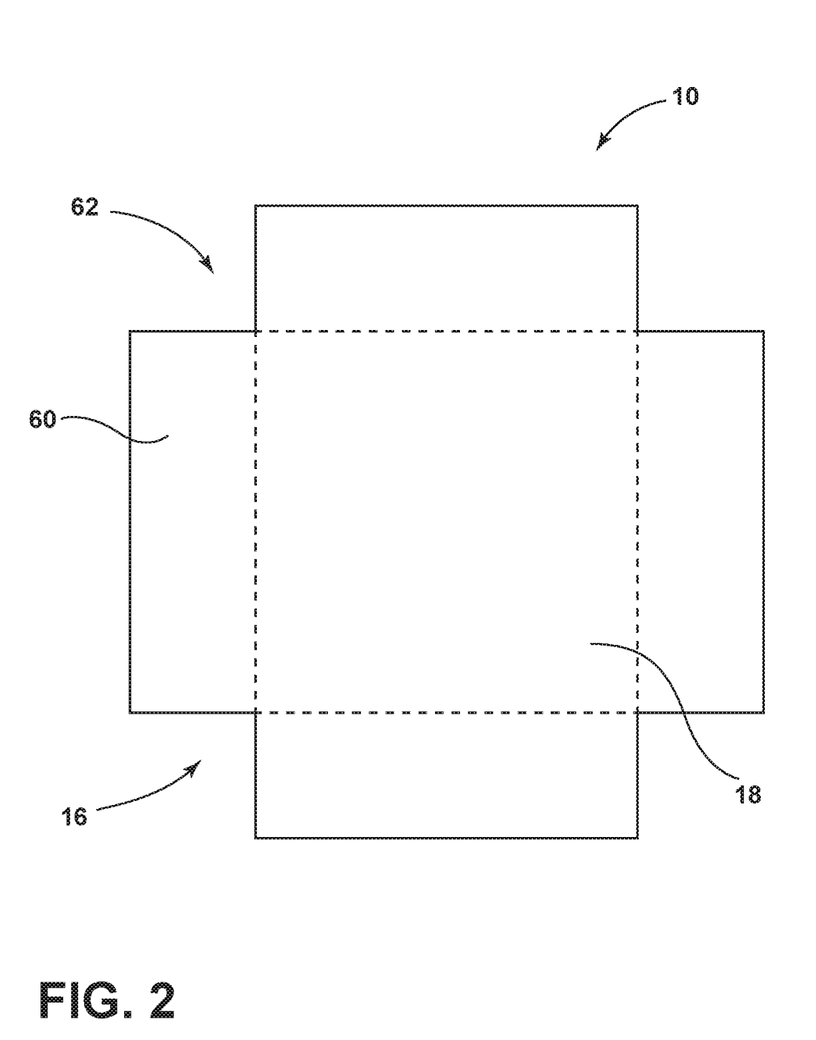
FIG. 2 is a top plan view of a metallic sheet having a plurality of side flanges shown in an unfolded state.
Figure 3:
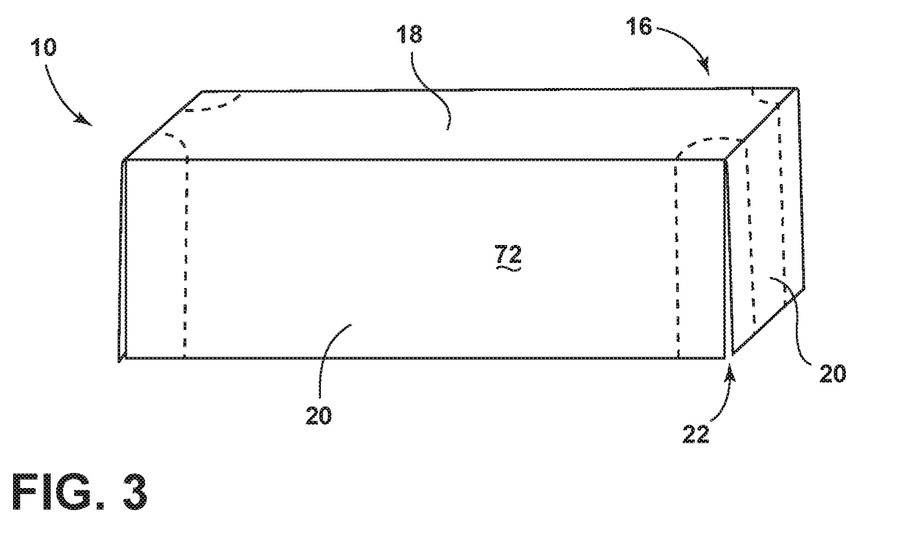
FIG. 3 is the metallic sheet of FIG. 2 shown in the folded state to define the structural outer panel.
Figure 4:
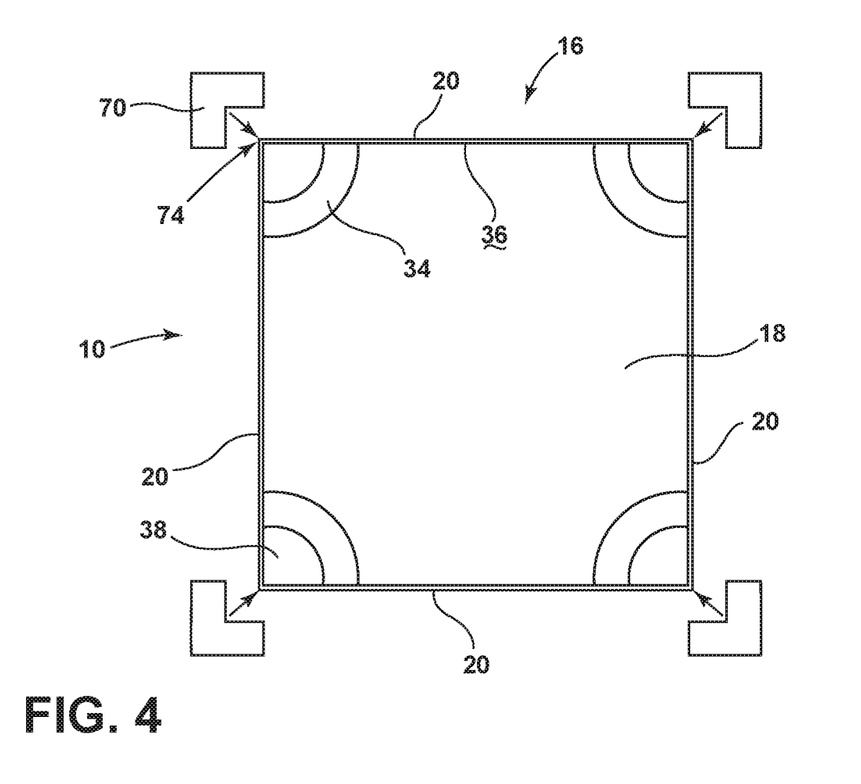
FIG. 4 is a top plan view of a structural outer panel showing the interior blocks positioned at each respective gap and the exterior blocks being moved into position proximate each respective gap.
Figure 5:
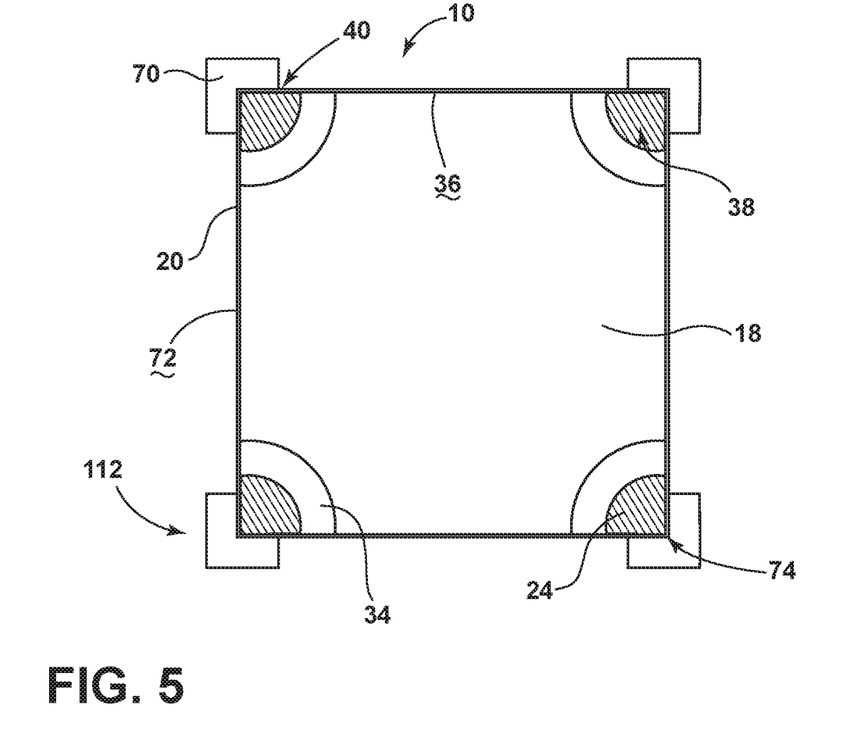
FIG. 5 is a top plan view of the structural outer panel of FIG. 4 showing the inner and outer blocks positioned proximate each respective gap and showing an adhesive within each adhesive cavity defined between the interior and exterior blocks.
Figure 6:
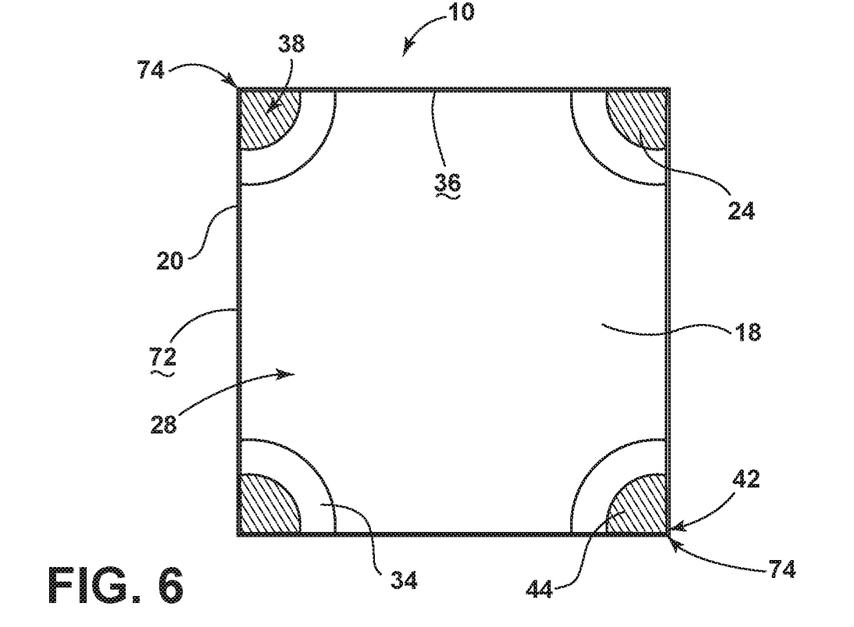
FIG. 6 is a top plan view of the structural outer panel of FIG. 5 showing the adhesive in a cured state and the exterior blocks removed.
Figure 7:
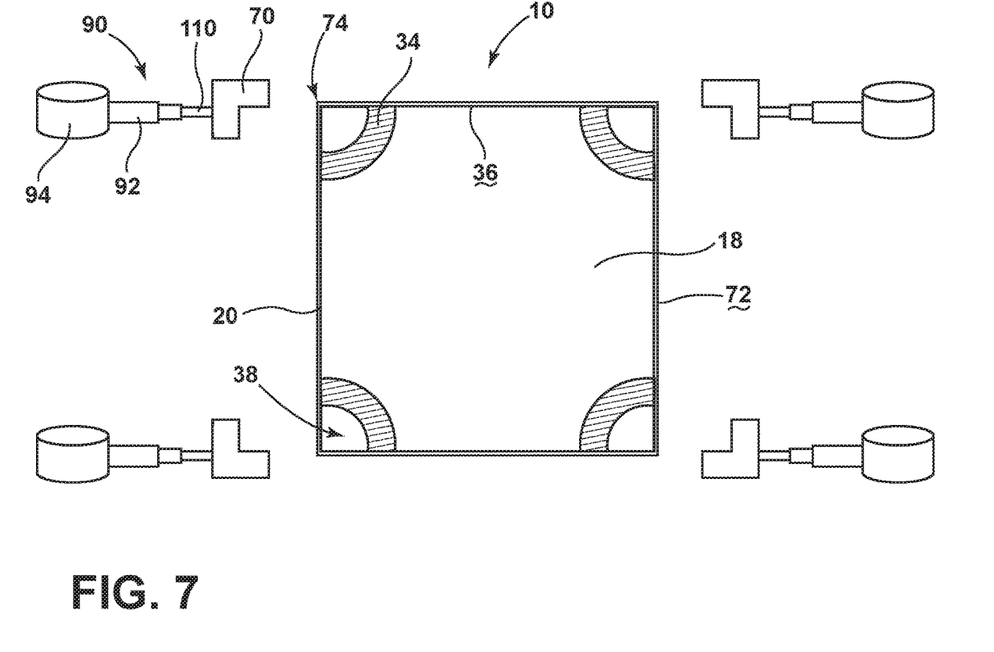
FIG. 7 is a top plan view of an alternate aspect of the structural outer panel showing the interior blocks positioned at the gap and the outer blocks being moved by a mechanical assembly to engage each respective gap.
Figure 8:
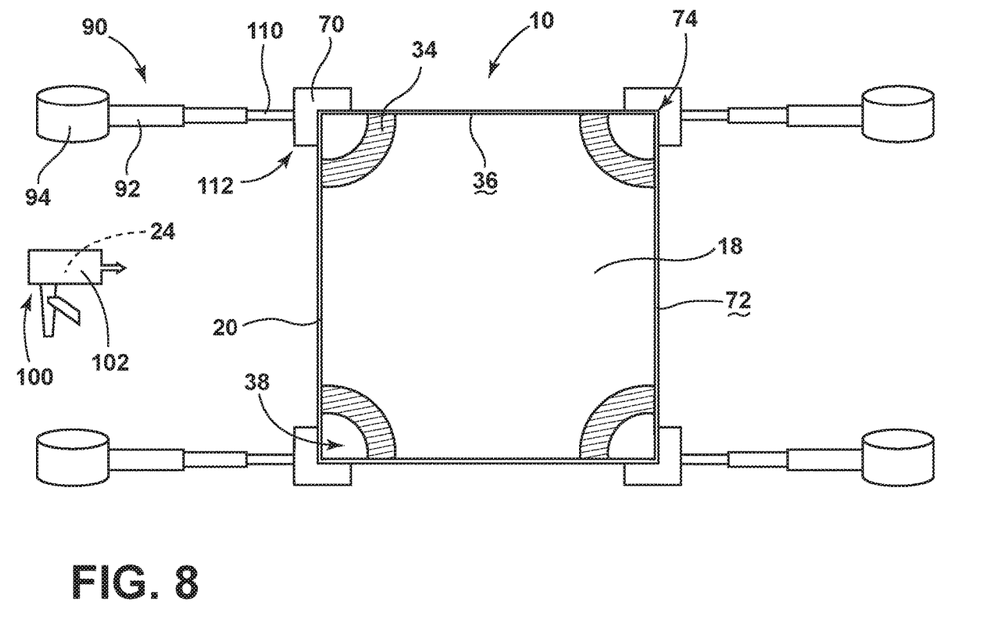
FIG. 8 is a top plan view of the structural outer panel of FIG. 7 showing the exterior blocks placed in position of each respective gap.
Figure 9:
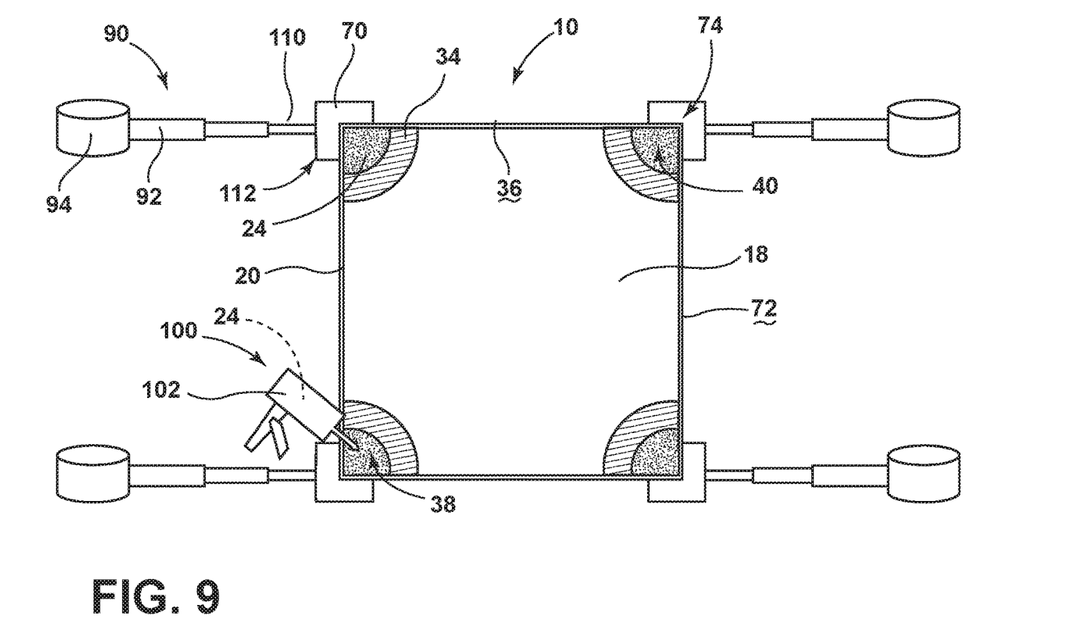
FIG. 9 is a top plan view of the structural outer panel of FIG. 8 showing adhesive being deposited within each adhesive cavity defined by the interior and exterior blocks.
Figure 10:
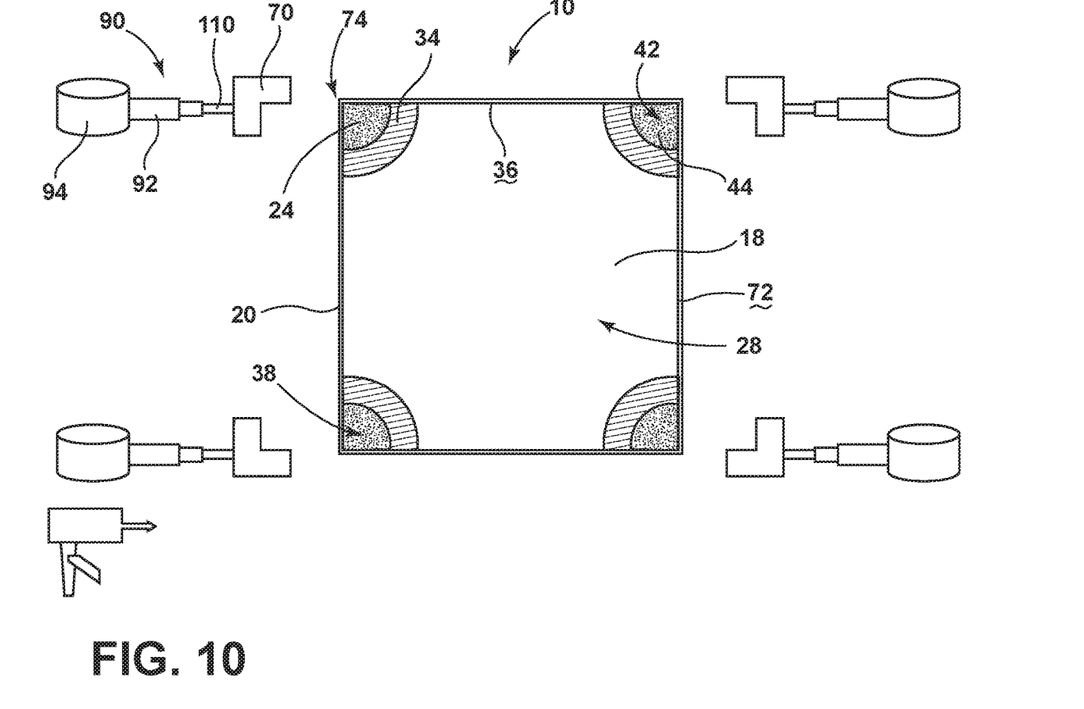
FIG. 10 is a top plan view of the structural outer panel of FIG. 9 showing the exterior blocks being removed and showing the adhesive in a cured state.
Figure 11:
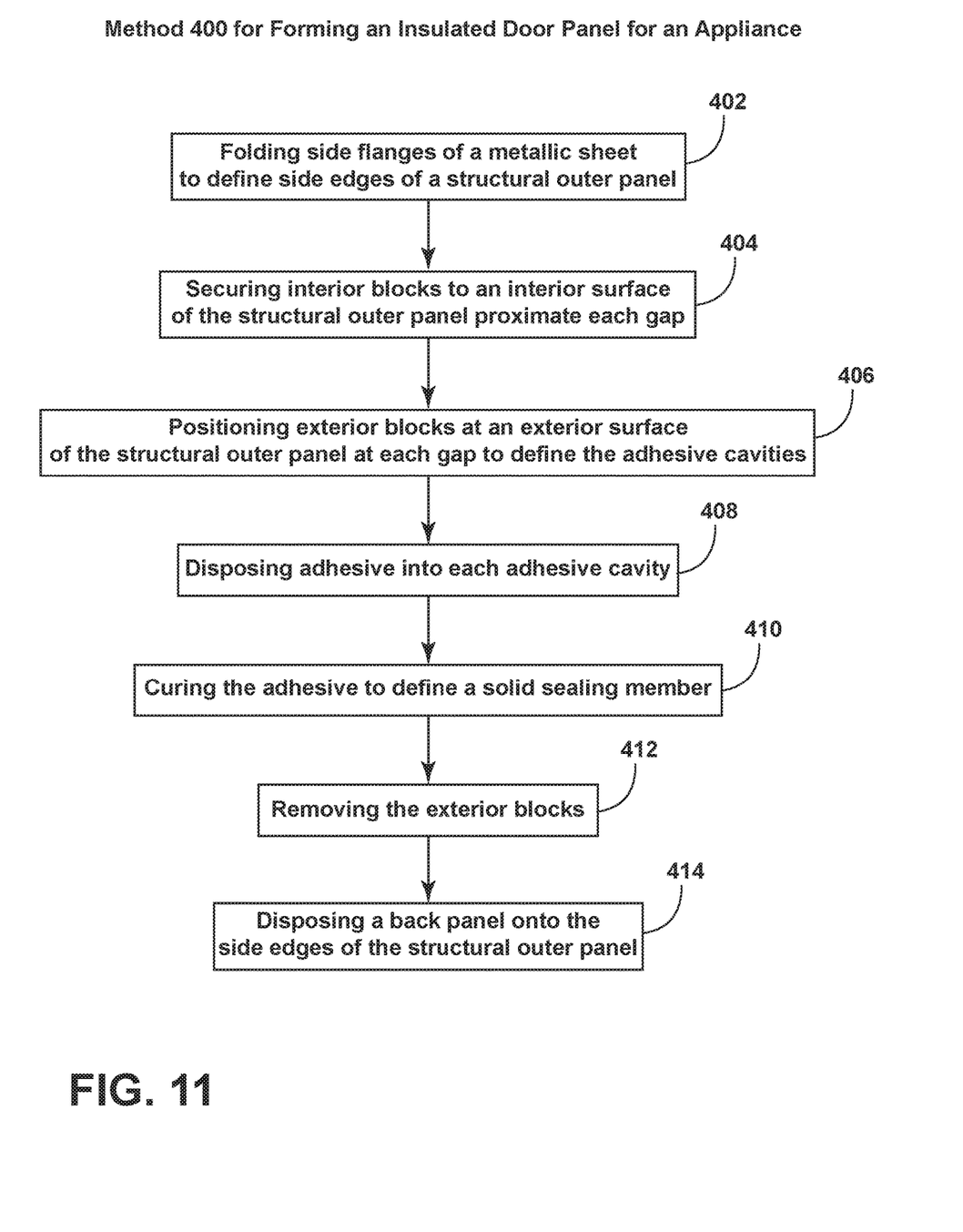
FIG. 11 is a schematic flow diagram illustrating a method for forming an insulated door panel for an appliance.
Figure 12:
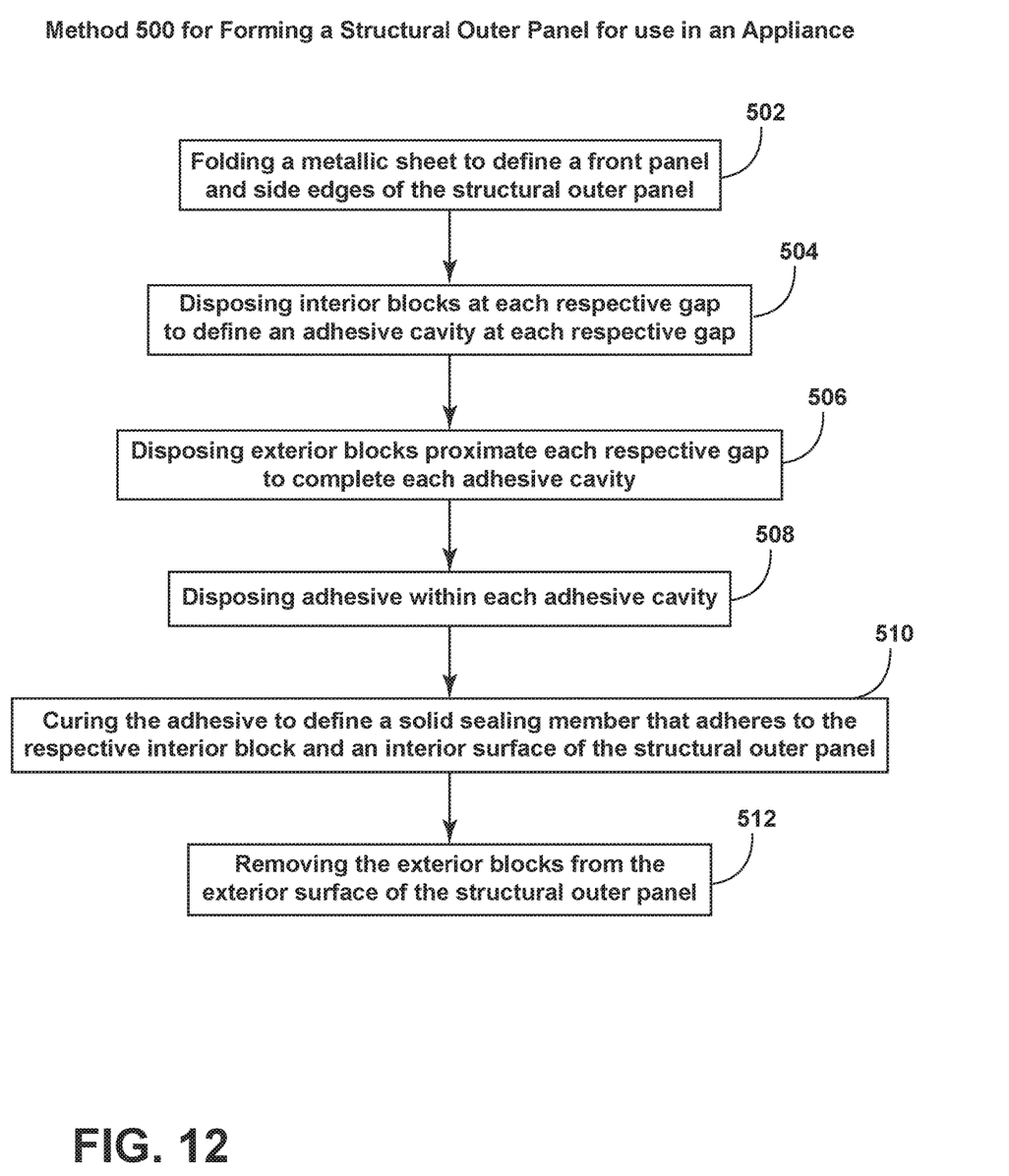
FIG. 12 is a schematic flow diagram for illustrating a method for forming structural outer panel for an appliance.
Figure 13:
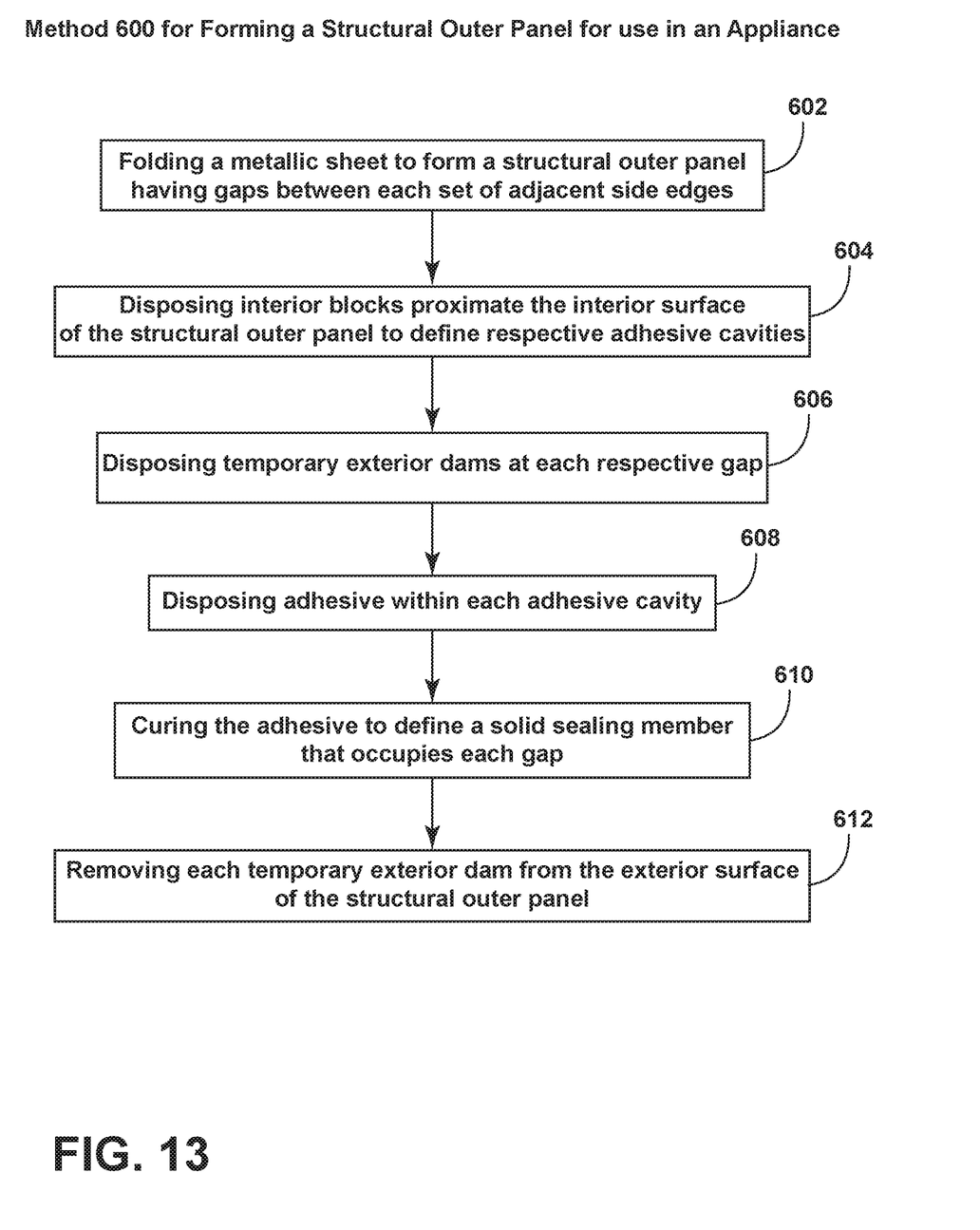
FIG. 13 is a schematic flow diagram illustrating a method for forming a structural outer panel for a door of an appliance.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-6, reference numeral 10 generally refers to a structural outer panel that can be used in a door panel 12 for an appliance 14. According to the various embodiments, the structural outer panel 10 can be made from a metallic sheet 16 that is bent into the shape of the structural outer panel 10 that includes a front panel 18 and a plurality of side edges 20 that extend back from the front panel 18. Because the side edges 20 are folded to be substantially perpendicular to the front panel 18, a series of gaps 22 can be defined between each set of adjacent side panels of the structural outer panel 10. In order to seal these gaps 22, a sealing adhesive 24 is disposed at each gap 22 so that an insulating material 26 can be disposed within an insulating cavity 28 at least partially defined by the structural outer panel 10. By placing the sealing adhesive 24 at each gap 22, each gap 22 is thereby hermetically sealed. After the entire structure of the door panel 12 is formed, gas 30 can be expressed, expelled, or otherwise removed from the insulating cavity 28 within the door panel 12 to define a vacuum insulated structure 32. With the sealing adhesive 24 at each of the gaps 22, gas 30 and vapor are substantially prevented from permeating into the insulating cavity 28 via the now-sealed gaps 22 within the structural outer panel 10.

Referring again to FIGS. 1-6, in order to maintain the position of the sealing adhesive 24 during curing, it is contemplated that a series of interior blocks 34 can be secured, attached, adhered, or otherwise disposed against two of the side edges at an interior surface 36 of the structural outer panel 10 proximate each respective gap 22. In this manner, the interior blocks 34 remain adhered to the interior surface 36 of the structural outer panel 10 at two adjacent side edges to define an adhesive cavity 38 that receives the adhesive 24 in an uncured state 40. After the adhesive 24 defines a cured state 42 to form the solid sealing member 44, the interior blocks 34 remain in place during the life of the appliance 14 and supplement the hermetic sealing capability of the solid sealing member 44. It is contemplated that the sealing adhesive 24 can be a fast-curing adhesive 24 that is held in place during the curing process by the interior blocks 34, the interior surface 36 of the structural outer panel 10 and also temporarily positioned exterior blocks 70 that are set against the exterior surface 72 of the structural outer panel 10.

According to the various embodiments, the door panel 12 that incorporates the sealing adhesive 24 within each gap 22 of the structural outer panel 10 can be used in various configurations. By way of example, and not limitation, the structural outer panel 10 can be formed for use as a door panel 12, a drawer panel 50, a sliding panel, a structural cabinet 52, or other similar structural member within which a vacuum may be defined. The structural outer panel 10 can also be used within various appliances 14. Such appliances 14 can include, but are not limited to, refrigerators, freezers, coolers, hot water heaters, dishwashers, laundry appliances, combinations thereof, and other similar household and commercial appliances and fixtures.

Referring now to FIGS. 1-6 and 11, having described various aspects of the structural outer panel 10 that is formed from the folded metallic sheet 16, a method 400 is disclosed for forming an insulated door panel 12 for an appliance 14. According to the method 400, side flanges 60 of the metallic sheet 16 are folded to define side edges 20 of a structural outer panel 10 (step 402). In the unfolded state 62, it is contemplated that the side flanges 60 can be co-planar with a front panel 18 of the metallic sheet 16. Once folded, the side flanges 60 define side edges 20 of the structural outer panel 10 that extend substantially perpendicular from the front panel 18. In this manner, a series of gaps 22 are defined between each set of adjacent side edges 20 of the structural outer panel 10. After the structural outer panel 10 is formed, interior blocks 34 are secured to an interior surface 36 of the structural outer panel 10 and proximate each respective gap 22 (step 404). Securing or otherwise disposing the interior blocks 34 proximate the gap 22 serves to at least partially define an adhesive cavity 38 at each respective gap 22. According to the various embodiments, it is contemplated that the interior blocks 34 can be attached, adhered, fastened or otherwise secured to the interior surface 36 of the structural outer panel 10. In this manner, the interior blocks 34 are designed to be permanently left within the structural outer panel 10 after the formation of the door panel 12 for the appliance 14.

Referring again to FIGS. 1-6 and 11, in order to complete the adhesive cavity 38, exterior blocks 70 are positioned or otherwise disposed at an exterior surface 72 of the structural outer panel 10 and at each respective gap 22 (step 406). By positioning the exterior blocks 70 at the exterior surface 72, portions of the side flanges 60 are held in place between the interior and exterior blocks 34, 70 at each gap 22. In this manner, adjacent side flanges 60 at each gap 22 are held in place between the interior and exterior blocks 34, 70 such that the gap 22 is substantially minimized to define a seam 74 between adjacent side edges 20 of the structural outer panel 10. The formation of the minimal seam 74 serves to minimize the appearance of the adhesive 24 in the cured state 42 within the gap 22 such that the final seam 74 has an appearance of being defined only by the side edges 20 of the structural outer panel 10. In this manner, no welding or additional fasteners may be necessary in order to seal and secure the adjacent side edges 20 of the structural outer panel 10 to define the minimal seam 74.

Referring again to FIGS. 1-6 and 11, after formation of the adhesive cavity 38 by the interior and exterior blocks 34, 70 engaged with the structural outer panel 10, an adhesive 24 is disposed within each adhesive cavity 38 (step 408). The adhesive 24 is disposed to substantially fill each gap 22 and is contained in the adhesive cavities 38 by the interior and exterior blocks 34, 70 and also by the interior surface 36 of the structural outer panel 10. The adhesive 24 is then cured to define a solid sealing member 44 within each adhesive cavity 38 (step 410). The solid sealing member 44 adheres to the respective interior block 34 and the interior surface 36 of the structural outer panel 10 to form a sealed structural outer panel 10. After forming the sealed structural outer panel 10, the exterior blocks 70 are removed from the exterior surface 72 of the structural outer panel 10 (step 412). Each solid sealing member 44 defines a hermetic seal at each respective gap 22. In order to form the structure of the door panel 12, a back panel 80 can be disposed onto the side edges 20 of the structural outer panel 10 (step 414). In this manner, the back panel 80, structural outer panel 10 and the solid sealing members 44 define an insulating cavity 28 therein.

Referring now to FIGS. 1-10, it is contemplated that the exterior blocks 70 can be positioned against the exterior surface 72 of the structural outer panel 10 and removed therefrom either manually, or through operation of a mechanical assembly 90 that engages each exterior block 70 to the exterior surface 72 of the structural outer panel 10. The mechanical assembly 90 can also remove the exterior blocks 70 after the adhesive 24 is cured to define the cured state 42 and the solid sealing member 44. The mechanical assembly 90 is a motorized system that can take several forms that can include, but are not limited to, operable arms 92, motorized actuators 94, levers, inflatable assemblies, rotating mechanisms, sliding mechanisms, combinations thereof, and other similar operable mechanisms that can be used to engage and disengage the exterior blocks 70 from the exterior surface 72 of the structural outer panel 10. In this manner, each exterior block 70 is adapted to be reused for forming multiple sealed structural panels.

According to various embodiments, it is also contemplated that each exterior block 70 can be formed by a multi-component assembly where a first component engages one side edge 20 of the structural outer panel 10 and another component of the exterior block 70 engages an adjacent side edge 20 to form the complete exterior block 70 proximate each gap 22.

It is contemplated that during assembly, the metallic sheet 16 can be moved into a forming portion of a mechanical assembly 90. This mechanical assembly 90 can include folding members that serve to fold each side flange 60 into the side edges 20 of the structural outer panel 10. While in the mechanical assembly 90, operable members can place the interior blocks 34, the exterior blocks 70 and also dispose the adhesive 24 within the adhesive cavities. It is also contemplated that the structural outer panel 10 can be formed through some manual operations and some mechanically performed operations that are performed by the mechanical assembly 90. An assembly line can also be used where various steps of the mechanical assembly 90 are used to perform the various operations for creating the insulated door panel 12 for the appliance 14.

Referring again to FIGS. 1-10, it is contemplated that an insulating material 26 can be disposed within the insulating cavity 28. This insulating material 26 can be disposed therein before placement of the back panel 80 onto the side edges 20. The insulating material 26 can also be placed within the insulating cavity 28 via an insulation port defined within one of the back panel 80 and the structural outer panel 10. In such an embodiment, insulation can be blown, poured, or otherwise disposed within the insulating cavity 28 via the insulation port. After the insulating material 26 is disposed therein, gas 30 can be expressed from the insulating cavity 28 via a gas port such that the insulating cavity 28 defines an at least partial vacuum so that the door panel 12 can define a vacuum insulated structure 32. It is also contemplated that the insulating material 26 can be in the form of a separate vacuum insulated panel that is placed within the insulating cavity 28 before the back panel 80 is secured to the side edges 20 of the structural outer panel 10. The insulating material 26 can also be a combination of a vacuum insulated structure 32, such as a panel, and also additional insulating material 26 disposed within the insulating cavity 28. Combinations of these insulating materials 26 can also be used to define the vacuum insulated structure 32 of the door panel 12.

Referring again to FIGS. 1-10, it is contemplated that the interior blocks 34 can be made of various materials. Such materials can include, but are not limited to, metals, plastics, polymer-based materials, composite materials, elastomeric materials, combinations thereof and other similar materials. By way of example, and not limitation, where the interior blocks 34 are made of a polymer-based material, such materials can include polyvinyl chloride (PVC), polybutylene terephthalate (PBT), liquid crystal polymer (LCP) or other similar material having low permeation rates with respect to gasses and vapor. The exterior blocks 70 can be made of various materials that have low adhesive properties so that the exterior blocks 70 can be easily reused for forming multiple structural outer panels 10. The materials of the exterior blocks 70 can include metal, elastomers, polymer-based materials, composite materials, combinations thereof and other similar low-adhesive materials. Where the exterior blocks 70 are made from a polymer-based material, one non-limiting example of such a material can be polytetrafluoroethylene.

Referring again to FIGS. 1-10, as discussed previously, the interior blocks 34 are designed to remain within the insulating cavity 28, and define at least a portion of the insulating cavity 28 during the life of the door panel 12. Accordingly, the material of the interior block 34 will typically have at least some insulating and/or sealing properties that supplement the insulating material 26 and/or the solid sealing members 44 positioned at each gap 22 of the structural outer panel 10.

Referring again to FIGS. 1-10, it is contemplated that the adhesive 24 is a fast-curing adhesive 24. Additionally, the adhesive 24 can be in the form of an encapsulating adhesive. Such encapsulating adhesive can be a silicone-based adhesive, an epoxy-based adhesive, a composite encapsulating material, combinations thereof, hybrids thereof and other similar adhesives 24 that can serve to quickly cure and form the solid sealing member 44 for hermetically sealing each gap 22 within the structural outer panel 10. To assist in the fast-curing properties of the adhesive 24, various hardening agents, catalysts and other curing materials can be added to the adhesive 24. Additionally, the adhesive 24 can be heated, cooled, dried or treated with another environmental condition to assist in the fast-curing nature of the adhesive 24. Additionally, the adhesive 24 and various components for curing the adhesive 24 can be disposed within the adhesive cavities 38 through use of an adhesive delivery system 100. This adhesive delivery system 100 can be operated to deliver a predetermined amount of adhesive 24 into each adhesive cavity 38. A spray mechanism or pump 102 can be operated to control the flow of adhesive 24.

Referring now to FIGS. 1-10 and 12, a method 500 is also disclosed for forming a sealed structural outer panel 10 for an appliance 14. According to the method 500, a metallic sheet 16 is folded to define a front panel 18 and side edges 20 of the structural outer panel 10 (step 502). Once folded into the structural outer panel 10, a gap 22 is defined between each set of adjacent side edges 20. Typically, the structural outer panel 10 will be a rectangular member such that four gaps 22 are disposed between the four sets of adjacent side edges 20. After forming a structural outer panel 10, interior blocks 34 are disposed proximate each respective gap 22 to define an adhesive cavity 38 at each respective gap 22 (step 504). The positioning of each interior block 34 against the interior surface 36 of the structural outer panel 10 at least partially forms the adhesive cavity 38. At this point in the process, each gap 22 is at least partially opened such that the insulating cavity 28 is not a fully defined space that can effectively hold the adhesive 24. According to the method 500, exterior blocks 70 are then disposed proximate each respective gap 22 in order to complete each adhesive cavity 38 (step 506). Each exterior block 70 is temporarily engaged with a respective set of adjacent side edges 20 to further define the adhesive cavity 38 at each gap 22.

Referring again to FIGS. 1-10 and 12, once each adhesive cavity 38 is formed, the adhesive 24 is then disposed within each adhesive cavity 38 (step 508). In this manner, the adhesive 24 substantially fills each gap 22 and is typically a viscous material that can substantially fill each adhesive cavity 38. The adhesive 24 is then cured to define a solid sealing member 44 that adheres to the respective interior block 34 and an interior surface 36 of the structural outer panel 10 (step 510). After the adhesive 24 is cured or at least substantially cured, the exterior blocks 70 can be removed from the exterior surface 72 of the structural outer panel 10 (step 512). It is contemplated that the adhesive 24 must be substantially cured so as to define a substantially solid sealing member 44. The cured state 42 is defined, at minimum, by a state of the adhesive 24 that will not flow through the gap 22 defined between the adjacent side edges 20.

As discussed above, the exterior blocks 70 can be operated by a mechanical assembly 90 that engages each exterior block 70 to the exterior surface 72 of the structural outer panel 10. The mechanical assembly 90 can also remove the exterior blocks 70 after the adhesive 24 reaches the cured state 42 to define the solid sealing member 44. It is contemplated that the mechanical assembly 90 can include individual operable arms 92 that are controlled by actuators 94 and have an exterior block 70 disposed at an end 110 of each respective operable arm 92. Each operable arm 92 can be selectively operated by an actuator 94 that manipulates and positions each exterior block 70 to be oriented at each respective gap 22 of the structural outer panel 10. The moments of each operable arm 92 can include telescoping to extend and retract, rotation, sliding, twisting, combinations thereof and other similar movements. It is also contemplated that the exterior blocks 70 can be moved into an engaging position 112 that pushes against the exterior surface 72 of the structural outer panel 10 to define the minimal seal at each gap 22. This engaging position 112 can be a finite position that is repeated for each structural outer panel 10 that is formed within the mechanical assembly 90. Through the use of the mechanical assembly 90, the structural outer panel 10 can be made in a repeated dimensional and consistent shape for each door panel 12. It is also contemplated that the operable arms 92 of the mechanical assembly 90 can be independently and selectively operated to engage the various gaps 22 that those positions may be slightly altered depending upon the shape of the structural outer panel 10 placed within the mechanical assembly 90. In such an embodiment, the operable arms 92 can be at least partially controlled by various sensors. Such sensors can include, but are not limited to, pressure sensors, dimensional sensors, lasers, combinations thereof and other sensors that can monitor the position of the exterior blocks 70 with respect to the respective gap 22 and the side edges 20.

Referring now to FIGS. 1-10 and 13, a method 600 is also disclosed for forming a vacuum structural outer panel 10 for an appliance door. According to the method 600, the metallic sheet 16 is folded to form a structural outer panel 10 that includes a plurality of side edges 20 and a gap 22 between each set of adjacent side edges 20 (step 602). Interior blocks 34 are disposed proximate the interior surface 36 of the structural outer panel 10 to define respective adhesive cavities 38 (step 604). Temporary exterior dams, typically in the form of the exterior blocks 70, can be disposed at each gap 22 (step 606). Through the placement of the interior and exterior blocks 34, 70 or the interior blocks 34 and the temporary exterior dams, each gap 22 is located within one of the adhesive cavities 38 formed therein. The adhesive 24 can then be disposed within each adhesive cavity 38 to fill each gap 22 (step 608). The adhesive 24 is then cured to define a solid sealing member 44 that occupies each gap 22 within each respective adhesive cavity 38 (step 610). The adhesive 24 in the cured state 42 serves to define the various solid sealing members 44 that hermetically seal each gap 22 between the adjacent side edges 20. Each temporary exterior dam, or exterior block 70, is then removed from the exterior surface 72 of the structural outer panel 10 (step 612). In this manner, the cured adhesive 24 in the form of the solid sealing member 44 hermetically seals each gap 22.

Referring again to FIGS. 1-13, as a portion of each of the methods 400, 500 and 600, completing the door panel 12 can include the additional steps of adding an insulating material 26 to an insulating cavity 28 defined within the structural outer panel 10. The disposal of insulation can be performed as substantially described herein. The timing of the installation can be various times throughout the formation of the door panel 12. By way of example, and not limitation, insulation can be disposed before the back panel 80 is installed. Additionally, the installation can be installed after the back panel 80 is disposed on the side edges 20, where the insulation can be disposed through an insulation port within the door panel 12.

The various methods 400, 500 and 600 can also include a step of disposing a back panel 80 onto the side edges 20 of the structural outer panel 10 to define the enclosed structure of the door panel 12. In this manner, the back panel 80, structural outer panel 10 and the cured adhesive 24 in the form of solid sealing members 44 can define an insulating cavity 28 therein. As discussed above, this insulating cavity 28 at the time of the placement of the back panel 80 can either be filled with insulation or can be filled with insulation after the placement of the back panel 80. It is also contemplated that an outer finish panel or veneer can be positioned over the structural outer panel 10 to alter the outer aesthetic appearance of the door panel 12.

Referring again to FIGS. 1-13, according to the various embodiments, the various aspects of the methods 400, 500 and 600 serve to use a fast-curing adhesive 24 for placement within each adhesive cavity 38 for quickly forming the solid sealing member 44 for the structural outer panel 10. The use of the removable exterior blocks 70 that can be manipulated for the use of the mechanical assembly 90 serves to use the fast-curing properties of the adhesive 24 to more expediently form the sealed structure for the door panel 12. It is contemplated that the exterior blocks 70 can be removed before the adhesive 24 is completely cured. In such an embodiment, when the exterior blocks 70 are removed, the cured state 42 of the adhesive 24 does not flow through the minimal seam 74 defined by the gap 22 between the adjacent side edges 20. Additionally, the cured state 42 is sufficient to maintain the positioning of each adjacent side edge 20 of the gap 22 to define the minimal seam 74 and prevent bending away of each adjacent side edge 20 to expand the size of the gap 22 beyond that of the minimal seam 74. Additionally, because the interior blocks 34 are adapted to be permanently installed within the structural outer panel 10, interior portions of the adhesive 24 that may not be cured can be contained within the adhesive cavity 38 through the permanent placement of the interior blocks 34. This configuration of the interior and exterior blocks 34, 70 serves to afford more time for the adhesive 24 to cure without maintaining the adhesive 24 and the structural outer panel 10 within a specific molding assembly. The interior blocks 34 sufficiently define the mold of the adhesive cavity 38 to contain the adhesive 24 long enough to completely cure without requiring that the structural outer panel 10 be maintained within a single forming mold.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulated panel for an appliance, the insulated panel comprising:
    a structural outer panel having a corner seam positioned between adjacent side edges that extend from a front panel;
    an interior block that is fixedly attached to the adjacent side edges and positioned to at least partially define an adhesive cavity between the adjacent side edges at the corner seam;
    a sealing member defined within the adhesive cavity; and
    a back panel attached at least to the adjacent side edges of the structural outer panel, wherein a continuous insulating cavity is defined at least between the back panel, the structural outer panel, and the interior block, wherein the continuous insulating cavity defines an at least partial vacuum.

2. The insulated panel of claim 1, wherein the sealing member is a cured adhesive.

3. The insulated panel of claim 1, wherein the interior block is made of a polymer-based material.

4. The insulated panel of claim 2, wherein the cured adhesive is an encapsulating adhesive.

5. The insulated panel of claim 2, wherein the cured adhesive is a composite encapsulating material.

6. The insulated panel of claim 1, wherein an insulating material is disposed within the continuous insulating cavity.

7. The insulated panel of claim 1, wherein the interior block is adhered to an interior surface of the structural outer panel.

8. The insulated panel of claim 1, wherein the interior block includes polybutylene terephthalate.

9. The insulated panel of claim 1, wherein the interior block is attached to the back panel.

10. The insulated panel of claim 1, wherein an exterior surface of the structural outer panel and a portion of the sealing member, being a solid sealing member, within the corner seam defines a continuous external surface that extends through each adjacent side edge of the structural outer panel.

11. The insulated panel of claim 1, wherein the back panel is metallic.

12. An insulated panel for an appliance, the insulated panel comprising:
    a structural outer panel having a corner seam positioned between adjacent side edges that extend from a front panel;
    an interior block that is fixedly attached to the adjacent side edges and positioned to at least partially define an adhesive cavity between the adjacent side edges at the corner seam, wherein the interior block is made of a polymer-based material;
    a sealing member defined within the adhesive cavity; and a back panel attached at least to the adjacent side edges of the structural outer panel, wherein a continuous insulating cavity is defined at least between the back panel, the structural outer panel, and the interior block.

13. The insulated panel of claim 12, wherein the sealing member is a cured adhesive.

14. The insulated panel of claim 12, wherein an insulating material is disposed within the continuous insulating cavity.

15. The insulated panel of claim 12, wherein the interior block is adhered to at least one of the back panel and an interior surface of the structural outer panel.

16. The insulated panel of claim 12, wherein an exterior surface of the structural outer panel and a portion of the sealing member, being a solid sealing member, within the corner seam defines a continuous external surface that extends through each adjacent side edge of the structural outer panel.

17. An insulated panel for an appliance, the insulated panel comprising:
- a structural outer panel having a corner seam positioned between adjacent side edges that extend from a front panel;
- an interior block that is fixedly attached to the adjacent side edges and positioned to at least partially define an adhesive cavity between the adjacent side edges at the corner seam, wherein the interior block includes polybutylene terephthalate;
- a sealing member defined within the adhesive cavity; and
- a back panel attached at least to the adjacent side edges of the structural outer panel, wherein a continuous insulating cavity is defined at least between the back panel, the structural outer panel, and the interior block.

18. The insulated panel of claim 17, wherein an insulating material is disposed within the continuous insulating cavity.

19. The insulated panel of claim 17, wherein the interior block is adhered to at least one of the back panel and an interior surface of the structural outer panel.

20. The insulated panel of claim 17, wherein an exterior surface of the structural outer panel and a portion of the sealing member, being a solid sealing member, within the corner seam defines a continuous external surface that extends through each adjacent side edge of the structural outer panel.

* * * * *